United States Patent
Chou

(10) Patent No.: US 7,280,336 B2
(45) Date of Patent: Oct. 9, 2007

(54) TRANSIENT VOLTAGE DETECTING CIRCUIT

(75) Inventor: Kuo-Yu Chou, HsinChu (TW)

(73) Assignee: Novatek Microelectronic Co., Hsin Chu (TW)

( * ) Notice: Subject to any disclaimer, the term of this patent is extended or adjusted under 35 U.S.C. 154(b) by 538 days.

(21) Appl. No.: 10/920,309

(22) Filed: Aug. 18, 2004

(65) Prior Publication Data

US 2005/0275994 A1    Dec. 15, 2005

(30) Foreign Application Priority Data

May 28, 2004   (TW) ................................ 93115386 A

(51) Int. Cl.
*H02H 3/22* (2006.01)
(52) U.S. Cl. ...................................................... 361/111
(58) Field of Classification Search ................. 361/111
See application file for complete search history.

(56) References Cited

U.S. PATENT DOCUMENTS 3,633,101 A * 1/1972 Johnson et al. ............. 324/102
5,107,139 A * 4/1992 Houston et al. ............... 327/18
5,999,392 A   12/1999 Sung et al.
6,078,201 A * 6/2000 Crotty ......................... 327/143
6,490,224 B2 * 12/2002 Manning ..................... 365/233

* cited by examiner

*Primary Examiner*—Ronald W. Leja
(74) *Attorney, Agent, or Firm*—Troxell Law Office, PLLC

(57) ABSTRACT

The invention provides a transient voltage detecting circuit for detecting a transient voltage occurring at a power supply or a ground of an electronic system. The circuit according to the invention includes a plurality of detecting units of which the outputs are initially latched by at least one voltage source. The circuit also includes a detecting device outputting a first logic according to the initial outputs of all of the detecting units. When the transient voltage occurs, it is ensured that the logic of the output of one of the detecting units is changed by the transient voltage or the decayed transient voltage, such that the decision device renewably outputs a second logic to trigger a resetting device of the electronic system in accordance with the outputs of all of the detecting units.

19 Claims, 8 Drawing Sheets

TRANSIENT VOLTAGE DETECTING CIRCUIT

BACKGROUND OF THE INVENTION

1. Field of the Invention

The present invention relates to a transient voltage detection circuit, especially to a transient voltage detection circuit in an electronic system capable of triggering a resetting device of the electronic system.

2. Description of the Prior Art

If a protection device is not installed in a common electronic system, while the electronic system is operating, the voltage thereof will be unstable due to external interference or the electromagnetic effect of the elements in the circuit board; thus, each element in the circuit will be forced to function under the environment of an unstable voltage, possibly causing an error in the system, a systemic crash, or even damage of elements. To solve the above problem, the prior art installs a manual reset device in the circuit, e.g. an electric switch with a button, so that a user, according to his/her experience, may judge whether the reset device should be driven to reset the electronic system.

An automatic reset circuit with the function of detecting transient voltage variation is disclosed in U.S. Pat. No. 5,999,392. The automatic reset circuit is used for detecting the transient voltage variation between the power supply and the ground, so as to reset the electronic system immediately. According to the invention, when a transient interference or disturbance occurs between the power supply and the ground in the circuit, the system can be reset immediately to avoid abnormal functioning of the elements in the circuit.

The detecting unit revealed in U.S. Pat. No. 5,999,392 detects the transient voltage variation by the manner of voltage-couple, and it occupies a larger area, so it is not suitable for small electronic apparatus, e.g. personal digital assistant (PDA), mobile phone, and so on. Moreover, while a transient voltage variation occurs between the power supply and the ground, damping will occur in the voltage of the power supply or the ground with time and space. Because the detecting unit itself also needs appropriate power to maintain normal operation, when a transient voltage variation occurs between the power supply and the ground, damping will also occur in the voltage of the power supply or the ground connecting to the above detecting unit. At this moment, the state of the detecting unit is difficult to be predicted, and it is difficult to predict whether the detecting unit can operate accurately in accordance with the design of which the voltage is under normal condition. In other words, when a transient voltage variation occurs between the power supply and the ground, it cannot be confirmed whether the detecting unit will work as if the voltage is normal. Thus, it is difficult for the above automatic reset device with the function of detecting transient voltage variation to achieve the expected function. In other words, although there is a transient voltage variation, the detecting unit may not detect it and maintains the original state. The behavior of the detecting unit is related to the position thereof and the manner of power damping, so the effect of power damping will be different if the detecting unit is located at different positions of the circuit. Therefore, the detection function of the detecting unit of the prior art is limited.

Therefore, the objective of the present invention is to provide a transient voltage detection circuit to solve the above problem.

SUMMARY OF THE INVENTION

The objective of the present invention is to provide a transient voltage detection circuit in an electronic system for improving the effect of detection by installing the detecting units with the manner of matrix distribution.

The transient voltage detection circuit of the present invention is applied to an electronic system. The electronic system comprises a power supply, a ground and a resetting device. The resetting device is capable of being triggered by the transient voltage detecting circuit of the present invention.

In a preferred embodiment, the transient voltage detection circuit of the present invention comprises N first detection devices, M second detection devices, at least one voltage source, and a decision device.

In the N first detecting devices, each of the first detecting devices comprises a respective number ($P_i$) of detecting units. Each of the detecting units has a first reference terminal, a second reference terminal, a setting input, and an output. In the ith first detecting device, the second reference terminals of all of the detecting units are coupled to the ground of the electronic system. The first reference terminal of the first detecting unit is coupled to the power supply of the electronic system. A first resistance is coupled between the first reference terminal of the (j+1)th detecting unit and the first reference terminal of the jth detecting unit. In the transient voltage detection circuit of the present invention, N is an integer equal to or larger than 1; i is an integer index ranging from 1 to N, and j is an integer index ranging from 1 to ($P_i$−1).

The setting input of each of the detecting units is respectively coupled to an output of at least one of the voltage source, such that the output of the one detecting unit is initially latched by the output of the voltage source coupled to the one detecting unit.

The decision device has an input port, and the input port is respectively coupled with the outputs of all of the detecting units. The decision device outputs a first logic according to the initial outputs of all of the detecting units.

When a transient voltage occurs at the power supply, in the ith first detecting device, the transient voltage is decayed by the first resistance coupled between the (j+1)th detecting unit and the jth detecting unit. The logic of the output of one of the detecting units is changed by the transient voltage or the decayed transient voltage, such that the decision device renewably outputs a second logic to trigger the resetting device in accordance with the outputs of all of the detecting units.

In the M second detecting devices, each of the second detecting devices comprises a respective number ($Q_k$) of detecting units identical to those in the first detecting devices. In the kth second detecting device, the first reference terminals of all of the detecting units are coupled to the power supply. The second reference terminal of the first detecting unit is coupled to the ground. A second resistance is coupled between the second reference terminal of the (l+1)th detecting unit and the second reference terminal of the lth detecting unit. In the above, M is an integer equal to or larger than 1; k is an integer index ranging from 1 to M, and l is an integer index ranging from 1 to ($Q_k$−1).

In the second detecting devices, the setting input of each of the detecting units is respectively coupled to an output of at least one of the voltage source, such that the output of the one detecting unit is initially latched by the output of the voltage source coupled to the one detecting unit.

The input port of the decision device is also respectively coupled with the outputs of all of the detecting units in the second detecting devices. The decision device outputs the first logic according to the initial outputs of all of the detecting units in the first detecting devices and the second detecting devices.

When the transient voltage occurs at the ground, in the kth second detecting device, the transient voltage is decayed by the second resistance coupled between the (l+1)th detecting unit and the lth detecting unit. The logic of the output of one of the detecting units in the second detecting devices is changed by the transient voltage or the decayed transient voltage, such that the decision device renewably outputs the second logic to trigger the resetting device in accordance with the outputs of all of the detecting units.

According to the present invention, in the transient voltage detection circuit in an electronic system, the decision device outputs a first logic according to the initial outputs of all of the detecting units. Once the transient voltage occurs, the detection circuit can ensure that the logic of the output of one of the detecting units is changed by the transient voltage or the decayed transient voltage, such that the decision device renewably outputs a second logic to trigger the resetting device in accordance with the outputs of all of the detecting units.

The transient voltage detection circuit of the present invention decays the introduced transient voltage to detect the transient voltage with damping, which appears with time and space, by resistance and by laying out a plurality of detecting units at appropriate positions in the space. Furthermore, the needed area for laying out the output signals in the circuit can be reduced by arranging the decision module appropriately, and the reduced area can be used to increase the number of detecting units, so as to raise the probability of detecting the transient voltage.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
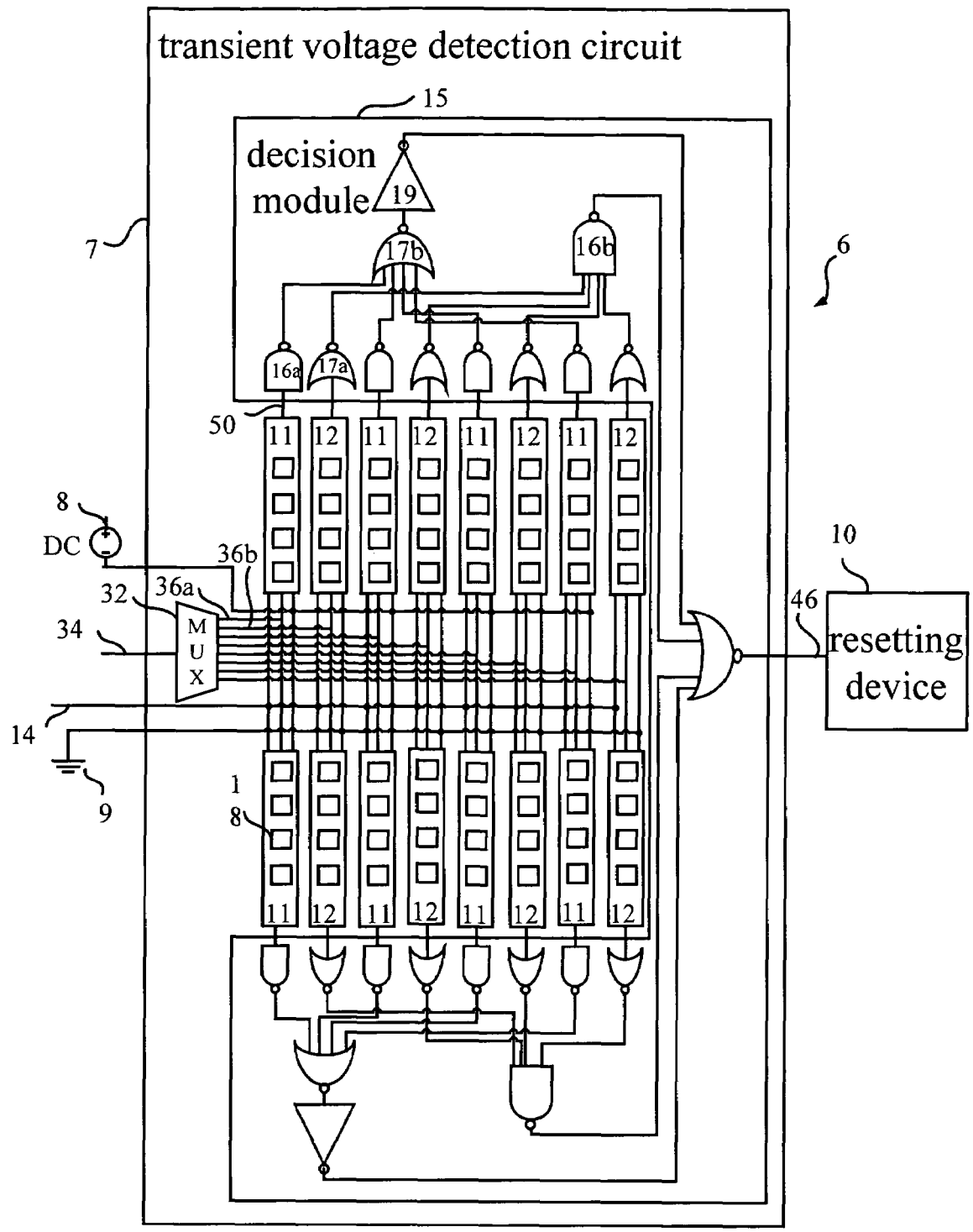
FIG. 1 is a schematic diagram of the transient voltage detection circuit in the electronic system according to the present invention.
Figure 2:
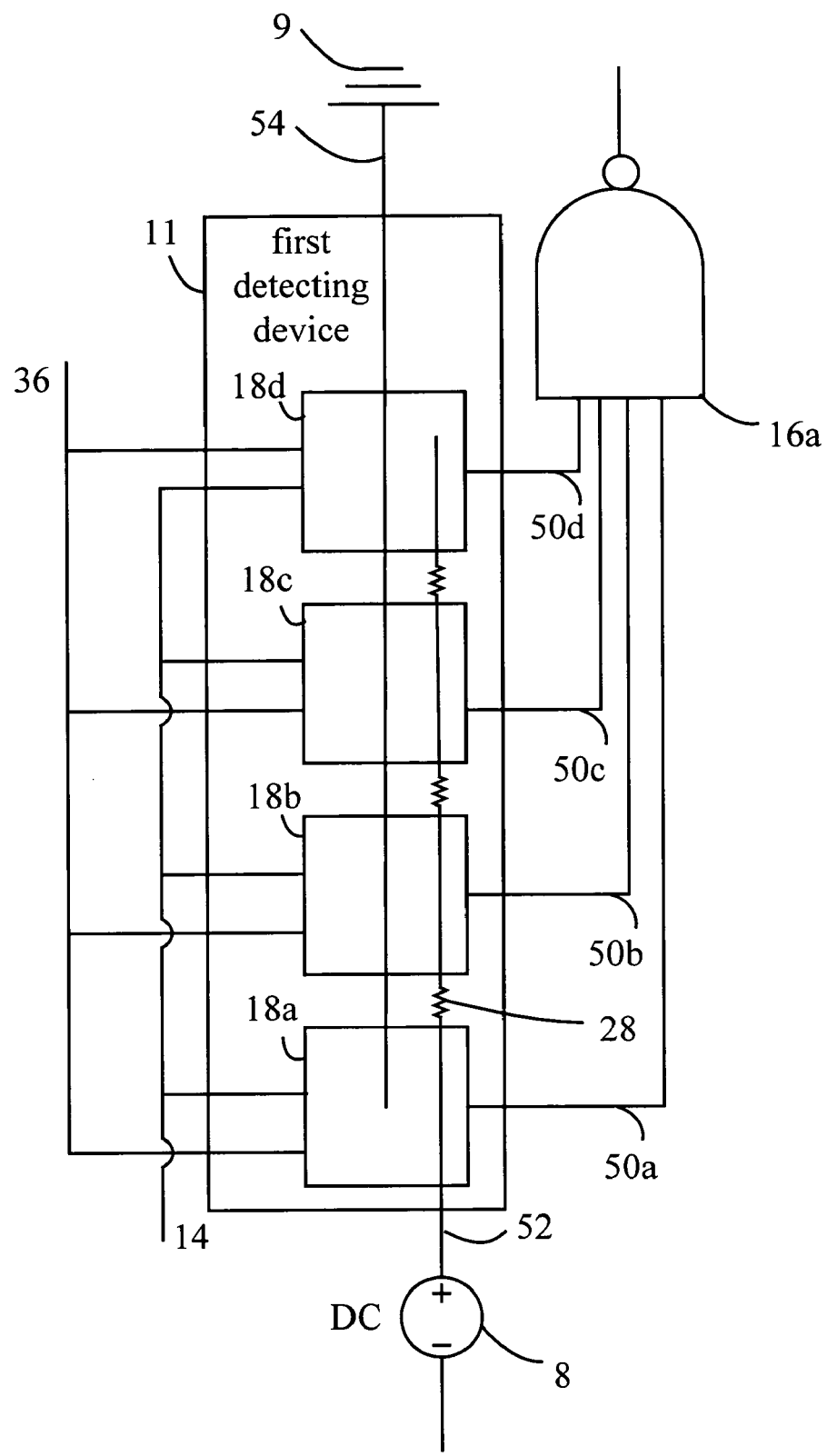
FIG. 2 is a schematic diagram of the first detecting device shown in FIG. 1.
Figure 3:
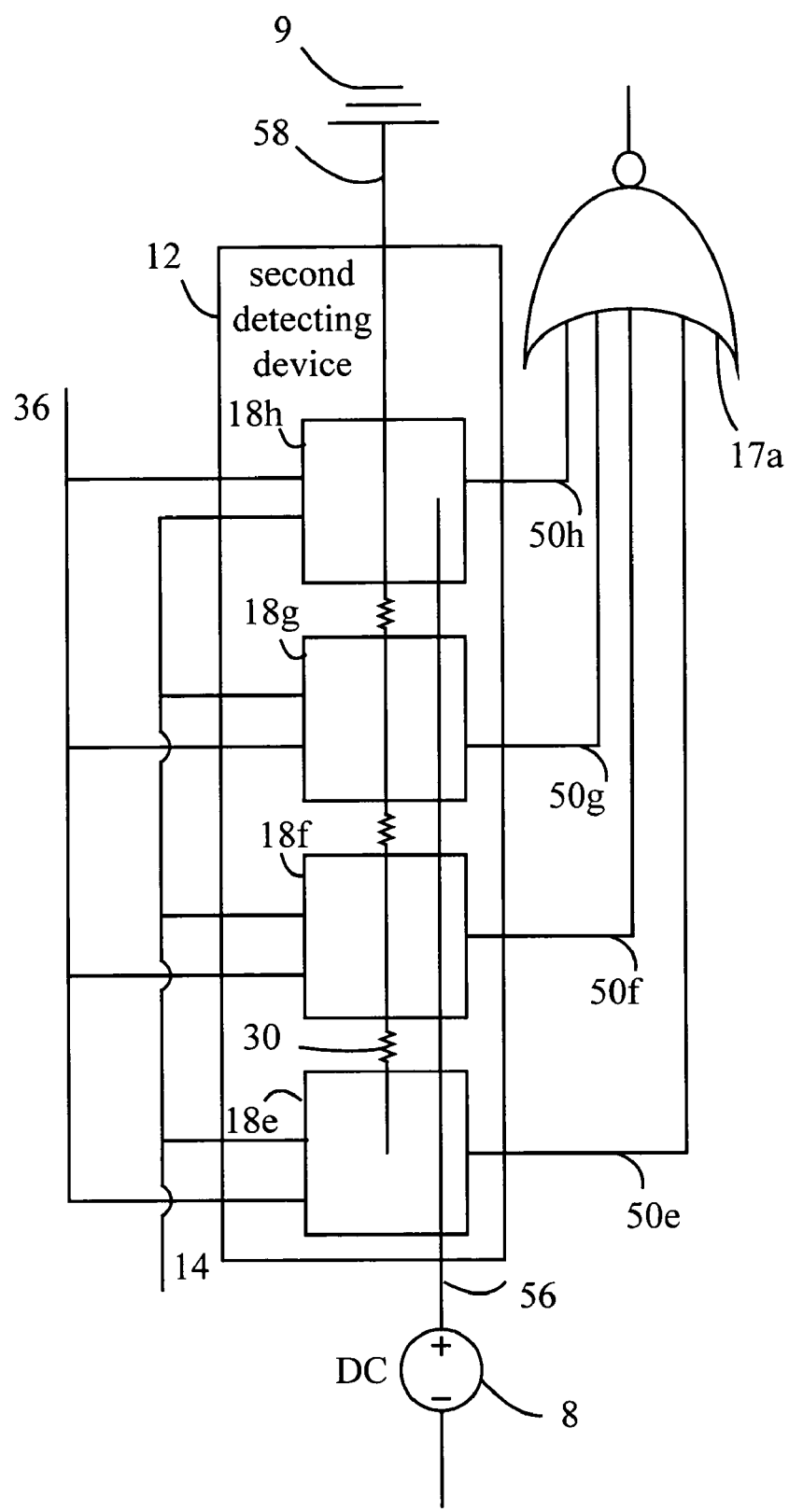
FIG. 3 is a schematic diagram of the second detecting device shown in FIG. 1.

Referring to FIG. 1 through FIG. 3, FIG. 1 is a schematic diagram of the transient voltage detection circuit 7 in the electronic system 6 according to the present invention. FIG. 2 is a schematic diagram of the first detecting device 11 shown in FIG. 1. FIG. 3 is a schematic diagram of the second detecting device 12 shown in FIG. 1. The present invention provides a transient voltage detection circuit in an electronic system. A resetting device of the electronic system can be triggered by the transient voltage detection circuit. In an embodiment, the transient voltage detection circuit 7 of the present invention is applied to an electronic system 6. The electronic system 6 comprises a power supply 8, a ground 9, and a resetting device 10. The transient voltage detection circuit 7 comprises N first detecting devices 11, M second detecting devices 12, at least one voltage source 14, a multiplexer 32, and a decision module 15. The above N and M are an integer equal to or larger than 1. The resetting device 10 can be triggered by the transient voltage detection circuit 7.

As shown in FIG. 1, the transient voltage detection circuit 7 of the present invention comprises a multiplexer 32, eight first detecting devices 11, eight second detecting devices 12, and a decision module 15. The multiplexer 32 is used for receiving a selection signal 34. In this embodiment, the selection signal 34 is an encoded signal encoded in 3 bits. According to the inputted selection signal 34, the multiplexer 32 can select and output a setting signal 36 corresponding to the inputted selection signal 34. For example, when the selection signal 34 is "000", the multiplexer 32 outputs a setting signal 36a; when the selection signal 34 is "001", the multiplexer 32 outputs a setting signal 36b, and so on.

As shown in FIG. 2, each of the first detecting devices 11 connects to the power supply 8 by a power cord 52 and connects to the ground 9 by a ground wire 54. Each of the first detecting devices 11 comprises four detecting units 18a~18d in parallel connection between the power cord 52 and the ground wire 54. The setting signal 36 and the voltage source 14 are respectively inputted to each detecting unit 18a~18d, and each detecting unit 18a~18d respectively outputs an output signal 50a~50d. A first resistance 28 is connected between each detecting unit 18a~18d on the power cord 52 to decay the power inputted from the power supply 8 or to decay the transient voltage inputted form the power supply 8.

As shown in FIG. 3, each of the second detecting devices 12 connects to the power supply 8 by a power cord 56 and connects to the ground 9 by a ground wire 58. Each of the second detecting devices 12 comprises four detecting units 18e~18h in parallel connection between the power cord 56 and the ground wire 58. The setting signal 36 and the voltage source 14 are respectively inputted to each detecting unit 18e~18h, and each detecting unit 18e~18h respectively outputs an output signal 50e~50h. A second resistance 30 is connected between each detecting unit 18e~18h on the ground wire 58 to decay the transient voltage inputted from the ground 9.

Figure 4:
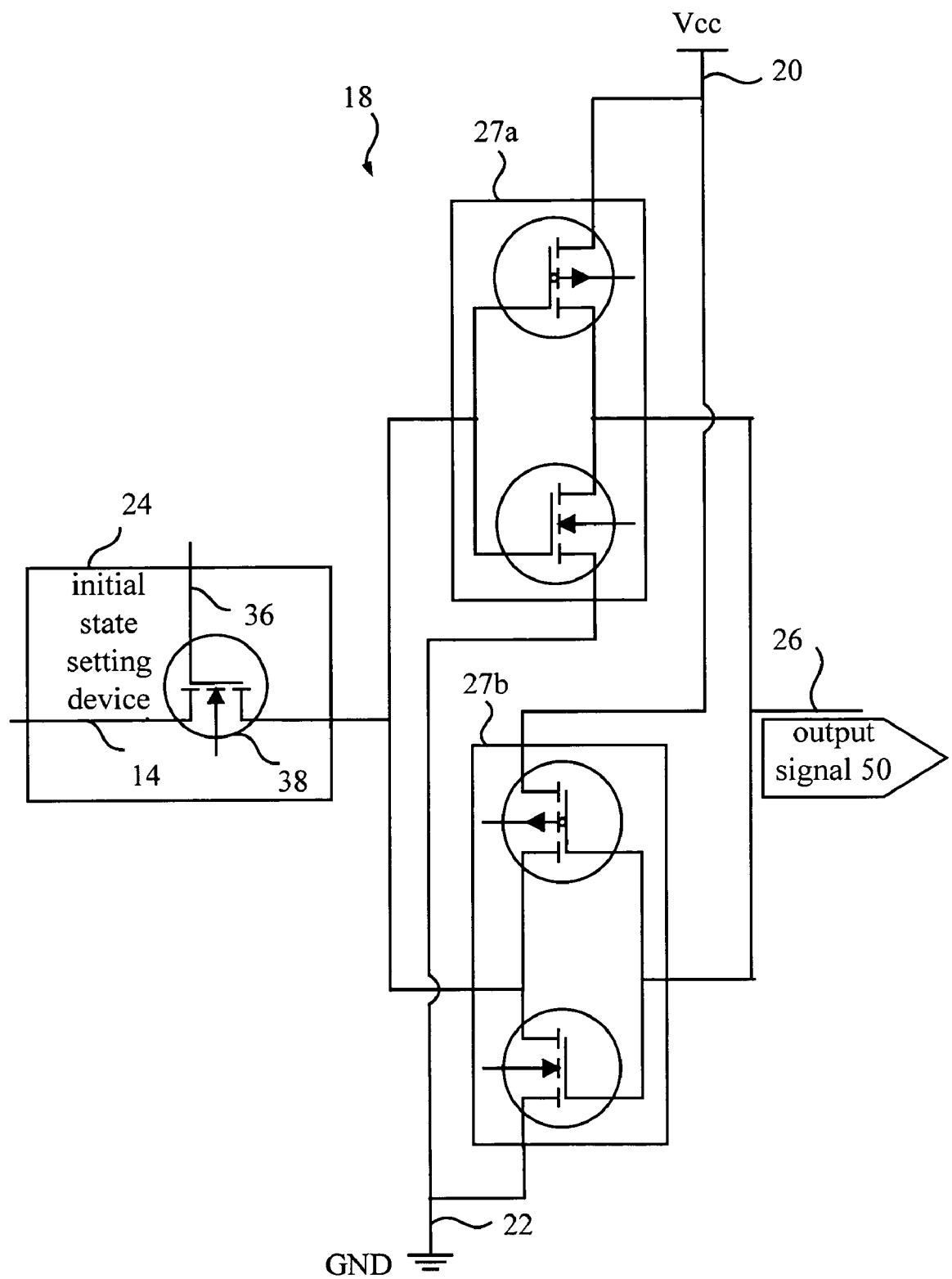
FIG. 4 is a schematic diagram of the detecting unit shown in FIG. 2 and FIG. 3.

Referring to FIG. 4, FIG. 4 is a schematic diagram of the detecting unit 18 shown in FIG. 2 and FIG. 3. The detecting unit 18 has an initial state setting device 24, two NOT gates 27a and 27b, a first reference terminal 20, a second reference terminal 22, and an output terminal 26. The first reference terminal 20 is coupled to the power cords 52, 56. The second reference terminal 22 is coupled to the ground wires 54, 58. The output terminal 26 is used for outputting the output signal 50. The initial state setting device 24 is used for setting the initial state of the output signal 50 of the detecting unit 18. In this embodiment, the initial state setting device 24 is formed by an N-type metal oxide semiconductor 38

(N-type MOS). The source of the N-type MOS 38 connects to the voltage source 14; the gate of the N-type MOS 38 connects to the setting signal 36, and the drain of the N-type MOS 38 connects to the NOT gates 27a and 27b. When the gate of the N-type MOS 38 receives the setting signal 36, the voltage source 14 is inputted to the NOT gates 27a and 27b immediately, and the output terminal 26 generates the output signal 50.

When the voltage source 14 is a low level signal, the output signal 50 is a high level signal, and when the voltage source 14 is a high level signal, the output signal 50 is a low level signal. Thus, the level of the initial state of the output signal 50 of the detecting unit 18 is determined by the inputted voltage source 14. When the transient voltage occurs, no matter the transient voltage is introduced from the power supply 8 or the ground 9 to the detecting unit 18, due to the transient voltage, the NOT gates 27a, 27b may operate abnormally to change the output signal 50 outputted by the output terminal 26 of the detecting unit 18. For example, if the initial state of the output signal 50 is low level, the output signal 50 may be changed to high level due to the transient voltage. If the initial state of the output signal 50 is high level, the output signal 50 may be changed to low level due to the transient voltage. Therefore, the detecting unit 18 can detect whether a transient voltage is inputted to the electronic system 6.

No matter the transient voltage is introduced from the power supply 8 or the ground 9 to the electronic system 6, when the transient voltage occurs, damping on the voltage of the power cords 52, 56 or the ground wires 54, 58 will appear with time or space. Moreover, because the detecting unit 18 itself may also be affected by the transient voltage and operate abnormally, only one detecting unit 18 in the transient voltage detection circuit 7 is not enough. Therefore, the detecting units 18 have to be laid out in the space appropriately to detect damping in the transient voltage appearing with time and space and to raise the probability of detecting the transient voltage.

As shown in FIG. 1 through FIG. 3, the transient voltage detection circuit 7 of the present invention comprises a multiplexer 32, eight first detecting devices 11, eight second detecting devices 12, and a decision module 15. According to the selection signal 34, the multiplexer 32 is used for outputting an appropriate setting signal 36 to the corresponding first detecting device 11 or the second detecting device 12, for transmitting the voltage source 14 to the detecting unit 18 of the first detecting device 11 or the second detecting device 12, and for setting the initial state of the output signal 50 of the detecting unit 18. In this embodiment, the initial state of the output signals 50a~50d of the detecting units 18a~18d in the first detecting device 11 is of high level, and the initial state of the output signals 50e~50h of the detecting units 18e18h in the second detecting device 12 is of low level.

The decision module 15 is used for receiving the output signal 50 of the detecting unit 18 and for outputting a resetting signal 46. The decision module 15 further comprises a plurality of decision devices consisting of NAND gate 16, NOR gate 17, or NOT gate 19.

Figure 5:
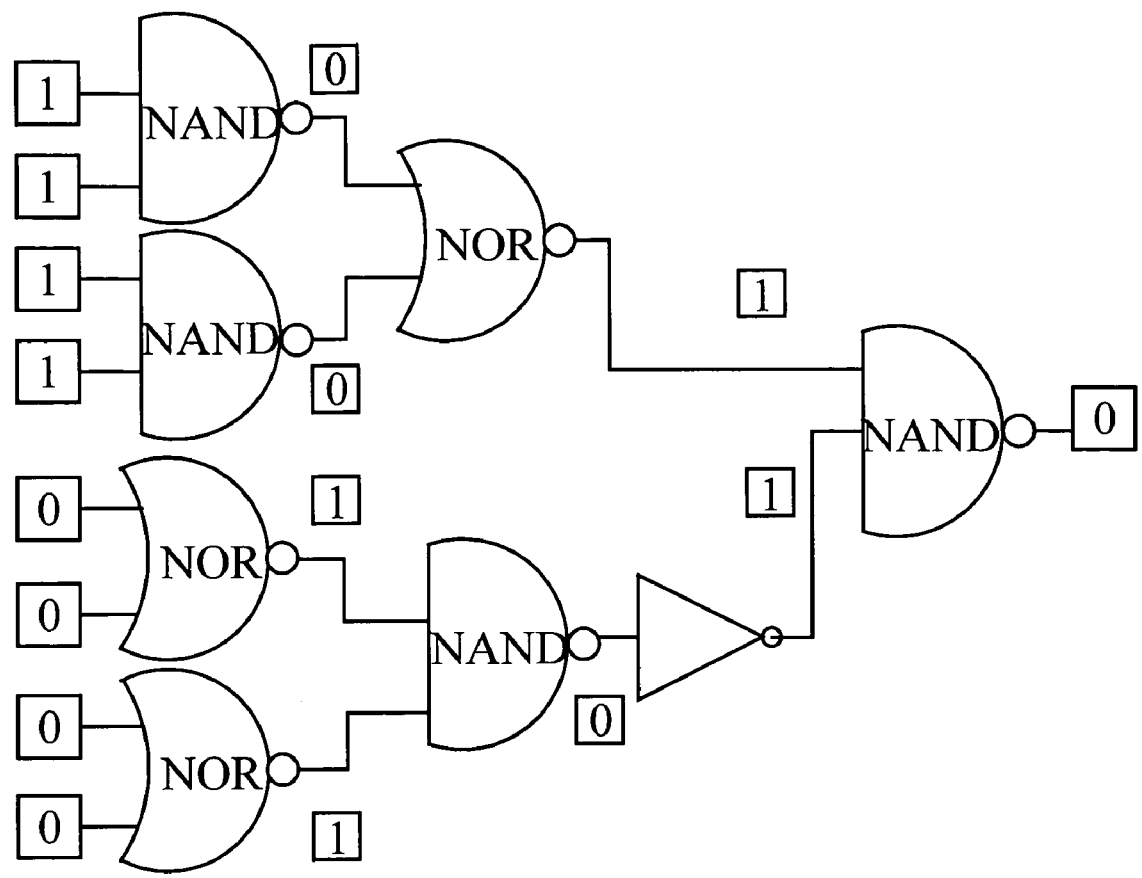
FIG. 5 is a schematic diagram of the logic of the decision module.

Referring to FIG. 5, FIG. 5 is a schematic diagram of the logic of the decision module 15. The NAND gate, the NOR gate, and the NOT gate of the decision device all comprise a plurality of input ports and an output port. The arrangement of the decision module 15 is in accordance with the state of the input port. When the signal of the input port is a low level signal at normal state and is a high level signal at abnormal state (e.g. the transient voltage is inputted), the NOR gate is selected as the decision device; otherwise, the NAND gate is selected as the decision device. If necessary, a NOT gate is added to change the level of signal of the output port.

As shown in FIG. 1 through FIG. 3, because the initial states of the output signals 50a~50d of the detecting units 18a~18d in the first detecting device 11 are of high level, the output signals 50a~50d are coupled to the input port of a NAND gate 16a. Because the signal outputted by the output port of the NAND gate 16a is a low level signal, a plurality of output ports of the NAND 16a are coupled to a NOR gate 17b.

Because the initial states of the output signals 50e~50h of the detecting units 18e~18h in the second detecting device 12 are of low level, the output signals 50e~50h are coupled to the input port of a NOR gate 17a. Because the signal outputted by the output port of the NOR gate 17a is a high level signal, a plurality of output ports of the NOR 17a are coupled to a NAND gate 16b.

The decision module 15 receives a plurality of output signals 50. The output signals 50 are processed by the decision devices to generate the resetting signal 46. Under the initial state, the logic of the resetting signal 46 is a first logic (not shown). In this embodiment, the first logic is a high level signal. When the transient voltage is introduced from the power supply 8, the ground 9, or other paths to the electronic system 6, the output signal 50 of at least one of the detecting units 18 in the transient voltage detection circuit 7 of the present invention will change the output state thereof. Thus, the logic of the resetting signal 46 is changed to a second logic (not shown). In this embodiment, the first logic is a low level signal, and the resetting device 10 can be triggered by the resetting signal 46 having the second logic.

Therefore, the transient voltage detection circuit 7 of the present invention decays the introduced transient voltage to detect the transient voltage with damping, which appears with time and space, by the resistance and by laying out a plurality of detecting units 18 at appropriate positions in the space. Furthermore, the needed area for laying out the output signals 50 in the circuit can be reduced by arranging the decision module 15 appropriately, and the reduced area can be used to increase the number of detecting units, so as to raise the probability of detecting the transient voltage.

In order to detect the transient voltage introduced into the electronic system 6 as soon as possible, the transient voltage detection circuit 7 must be as close to the power pad or the ground pad as possible. Moreover, due to the improvement of the semiconductor manufacture technology, the transient voltage detection circuit 7 of the present invention can be directly laid out under the power pad or the ground pad. Therefore, for the electronic system 6 comprising a plurality of power pads and ground pads, the transient voltage detection circuit 7 of the present invention can be laid out under or over each of the power pads and ground pads, so as to detect the transient voltage which occurs randomly. Compared with the prior art, the detecting unit of the present invention does not utilize capacitance-coupling manner to detect the transient voltage. Moreover, the area occupied by the detecting unit of the present invention is smaller than prior art. Therefore, the transient voltage detection circuit 7 of the present invention can increase the number of detecting units per unit area, so as to improve the efficiency of detection.

In another embodiment of the present invention, the first resistances 28 and the second resistances 30 are formed by the via-plugs in the integrated circuit, which is the most different from FIG. 1 through FIG. 3. By utilizing the via-plugs, the area of the transient voltage detection circuit 7 can be further reduced.

The present invention utilizes a plurality of detecting units to detect the transient voltage, and it decays the transient voltage inputted into the detecting unit by resistance or via-plug. Therefore, the probability of the detecting unit detecting the transient voltage can be increase, so as to effectively detect the transient voltage that occurs randomly.

Figure 6:
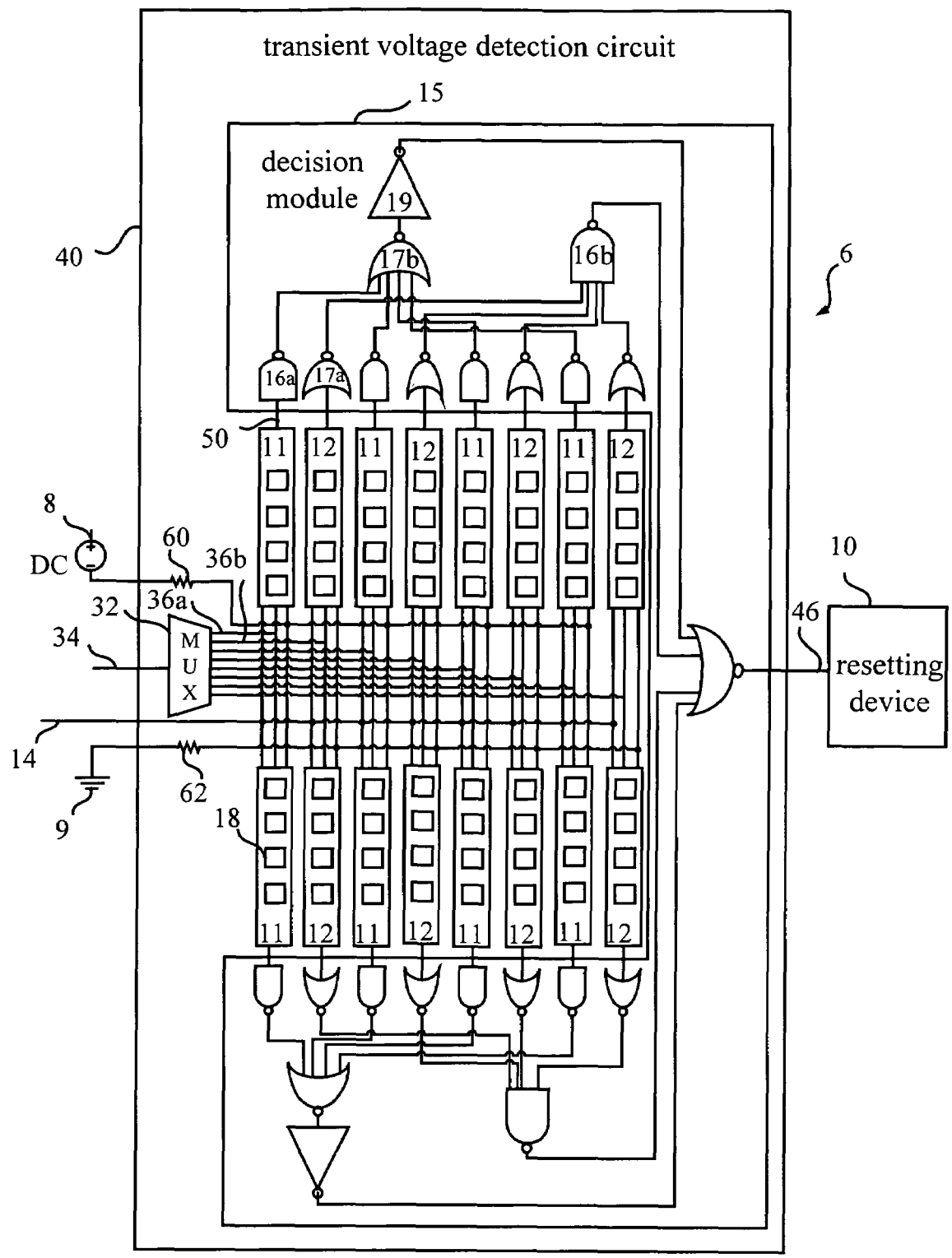
FIG. 6 is a schematic diagram of the transient voltage detection circuit of another embodiment according to the present invention.

Referring to FIG. 6, FIG. 6 is a schematic diagram of the transient voltage detection circuit 40 of another embodiment according to the present invention. To avoid causing damage to the transient voltage detection circuit 40 by electrostatic discharge (ESD), the circuit is laid out in accordance with the ESD rule, but it also needs a larger area. For the above mentioned problem, a third resistance 60 is connected to power supply 8 of the transient voltage detection circuit 40 of the present invention, and a fourth resistance 62 is connected to the ground 9, so as to solve the problem of ESD and reduce the needed area of the circuit. The resistance value of the third resistance 60 and the fourth resistance 62 may be set between 20 and 100 ohm.

Figure 7:
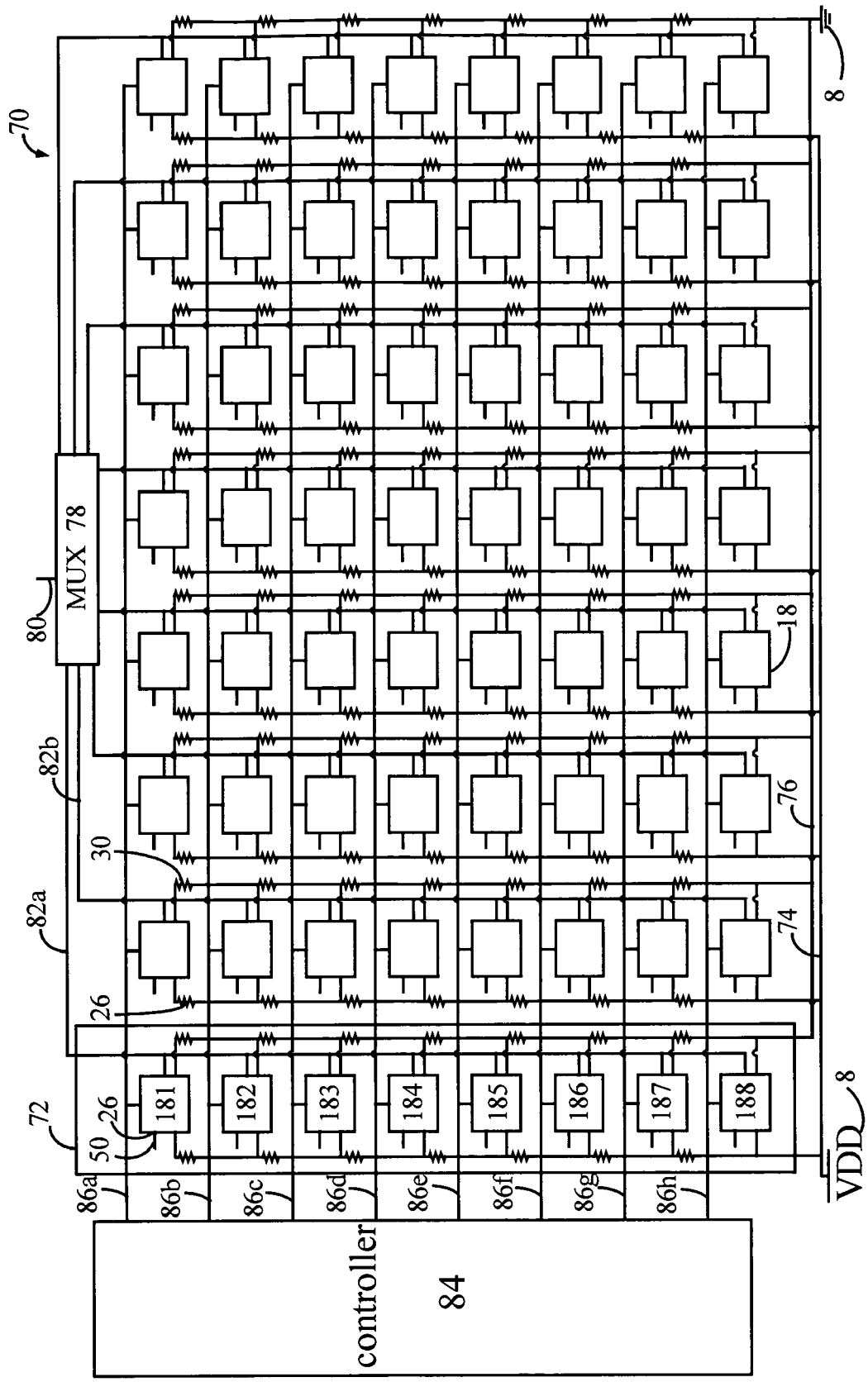
FIG. 7 is a schematic diagram of the transient voltage detection circuit of another embodiment according to the present invention.

Referring to FIG. 7, FIG. 7 is a schematic diagram of the transient voltage detection circuit 70 of another embodiment according to the present invention. As shown in FIG. 7, the transient voltage detection circuit 70 of the present invention comprises eight third detecting devices 72, a multiplexer 78, and a controller 84, wherein each of the third detecting devices 72 comprises eight detecting units 181~188. Each of the third detecting devices 72 connects to the power supply 8 by a power cord 74 and further connects to the ground 9 by a ground wire 76, wherein the eight detecting units 181~188 is in parallel connection between the power cord 74 and the ground wire 76. A first resistance 28 is connected between each detecting unit 181~188 on the power cord 74 to decay the power inputted from the power supply 8 or decay the transient voltage inputted from the power supply 8. Furthermore, a second resistance 30 is connected between each detecting unit 181~188 on the ground wire 76 to decay the transient voltage inputted from the ground 9.

In this embodiment, both the power cord 74 is coupled to the detecting unit 188 first; then, through the first resistance 28, coupled to the detecting unit 187, and so on. The ground 76 is coupled to the detecting unit 188 first, then, through the second resistance 30, coupled to the detecting unit 187, and so on. The transient voltage detection circuit 70 of the present invention is not limited to the above connection manner. The power cord 74 does not have to be decayed the same number of times as the ground wire 76 before being coupled to the detecting unit 18. In other words, the power cord 74 and the ground 76 may be decayed in different levels before coupling to the detecting unit 18.

As shown in FIG. 7, the multiplexer 78 is used for receiving a selection signal 80. In this embodiment, the selection signal 80 is an encoded signal encoded in 3 bits. According to the inputted selection signal 80, the multiplexer 78 can select and output a setting signal 82 corresponding to the inputted selection signal 80. For example, when the selection signal 80 is "000", the multiplexer 78 outputs a setting signal 82a, when the selection signal 80 is "001", the multiplexer 78 outputs a setting signal 82b, and so on. The controller 84 respectively outputs eight voltage sources 86a~86h to the corresponding detecting units 18.

In the transient voltage detection circuit 70, the initial state of each of the detecting units 18 is set by the corresponding setting signals 82 and voltage sources 86, and the output signal 50 is outputted by the output terminal 26 of the detecting unit 18.

Figure 8:
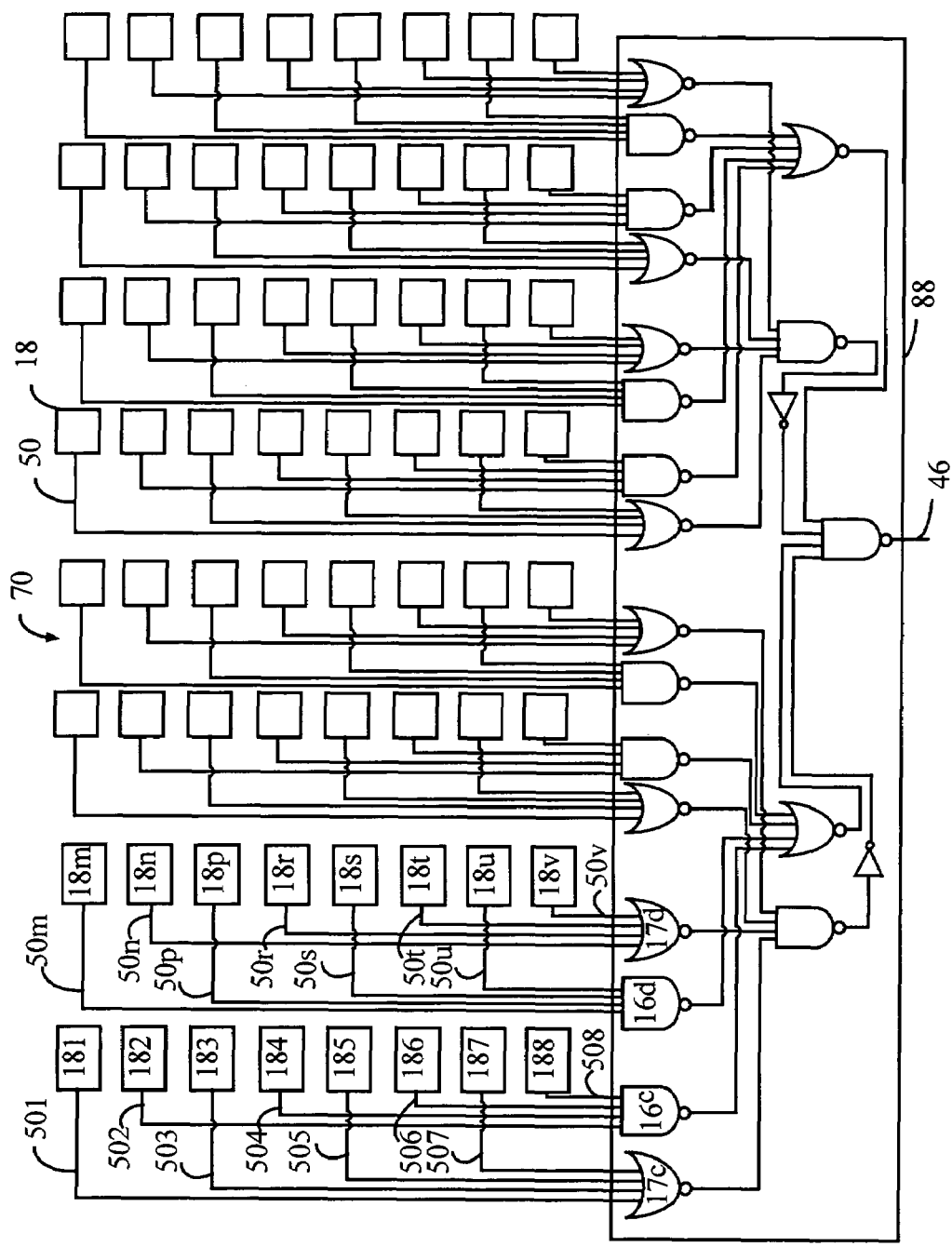
FIG. 8 is a schematic diagram of the decision module of the transient voltage detection circuit shown in FIG. 7.

Referring to FIG. 8, FIG. 8 is a schematic diagram of the decision module 88 of the transient voltage detection circuit 70 shown in FIG. 7. The transient voltage detection circuit 70 further comprises a decision module 88. The decision module 88 is used for receiving the output signal 50 from the detecting unit 18 and for outputting a resetting signal 46. The decision module 88 comprises a plurality of decision devices consisting of NAND gate 16, NOR gate 17, or NOT gate 19.

As shown in FIG. 8, in this embodiment, the initial states of the output signals 501, 503, 505, 507 of the detecting units 181, 183, 185, 187 are of low level, so the output signals 501, 503, 505, 507 are coupled to the input port of a NOR gate 17c. The initial states of the output signals 502, 504, 506, 508 of the detecting units 182, 184, 186, 188 are of high level, so the output signals 502, 504, 506, 508 are coupled to the input port of a NAND gate 16c.

The same as the above, the initial states of the output signals 50n, 50r, 50t, 50v of the detecting units 18n, 18r, 18t, 18v are of low level, so the output signals 50n, 50r, 50t, 50v are coupled to the input port of a NOR gate 17d. The initial states of the output signals 50m, 50p, 50s, 50u of the detecting units 18m, 18p, 18s, 18u are of high level, so the output signals 50m, 50p, 50s, 50u are coupled to the input port of a NAND gate 16d.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. In an electronic system comprising a power supply, a ground and a resetting device capable of being triggered by a transient voltage detecting circuit, the circuit comprising:

N first detecting devices which each comprises a respective number ($P_i$) of detecting units, each of the detecting units having a first reference terminal, a second reference terminal, a setting input and an output, in the ith first detecting device, the second reference terminals of all of the detecting units being coupled to the ground, the first reference terminal of the first detecting unit being coupled to the power supply, and a first resistance being coupled between the first reference terminal of the (j+1)th detecting unit and the first reference terminal of the jth detecting unit, wherein N is an integer equal to or larger than 1, i is an integer index ranging from 1 to N, and j is an integer index ranging from 1 to ($P_i$−1);

at least one voltage source, the setting input of each of the detecting units being respectively coupled to an output of at least one of the voltage sources such that the output of the one detecting unit is initially latched by the output of the voltage source coupled to the one detecting unit;

a decision device having an input port, respectively coupled with the outputs of all of the detecting units, the decision device outputting a first logic according to the initial outputs of all of the detecting units; and wherein when a transient voltage occurs at the power supply, in the ith first detecting device, the transient voltage is decayed by the first resistance coupled between the (j+1)th detecting unit and the jth detecting unit, the logic of the output of one of the detecting units is changed by the transient voltage or the decayed transient voltage, such that the decision device renewably outputs a second logic to trigger the resetting device in accordance with the outputs of all of the detecting units.

2. The circuit of claim 1, further comprising:

M second detecting devices which each comprises a respective number ($Q_k$) of detecting units identical to those in the first detecting devices, in the kth second detecting device, the first reference terminals of all of the detecting units being coupled to the power supply, the second reference terminal of the first detecting unit being coupled to the ground, and a second resistance being coupled between the second reference terminal of the (l+1)th detecting unit and the second reference terminal of the lth detecting unit, wherein M is an integer equal to or larger than 1, k is an integer index ranging from 1 to M, and l is an integer index ranging from 1 to ($Q_k$−1); and wherein the setting input of each of the detecting units in the second detecting devices being respectively coupled to an output of at least one of the voltage sources such that the output of the one detecting unit is initially latched by the output of the voltage source coupled to the one detecting unit;

wherein the input port of the decision device is also respectively coupled with the outputs of all of the detecting units in the second detecting devices, the decision device outputs the first logic according to the initial outputs of all of the detecting units in the first detecting devices and the second detecting devices; and wherein when the transient voltage occurs at the ground, in the kth second detecting device, the transient voltage is decayed by the second resistance coupled between the (l+1)th detecting unit and the lth detecting unit, the logic of the output of one of the detecting units in the second detecting devices is changed by the transient voltage or the decayed transient voltage, such that the decision device renewably outputs the second logic to trigger the resetting device in accordance with the outputs of all of the detecting units.

3. The circuit of claim 2, wherein all of the first resistances and the second resistances are implemented as via-plugs in a semiconductor structure of the electronic system.

4. The circuit of claim 3, wherein the semiconductor structure of the electronic system comprises a bonding pad, and all of the detecting units are laid out under the bonding pad.

5. The circuit of claim 4, wherein the semiconductor structure of the electronic system comprises a bonding pad, and all of the detecting units are laid out over the bonding pad.

6. The circuit of claim 5, wherein one of the detecting units comprises two NOT gates, and an output of one of the two NOT gates is coupled to an input of the other NOT gate.

7. The circuit of claim 6, wherein one of the detecting units comprises two NAND gates, and an output of one of the two NAND gates is coupled to an input of the other NAND gate.

8. The circuit of claim 7, wherein the first logic is logic high, and the second logic is logic low.

9. The circuit of claim 8, wherein the first logic is logic low, and the second logic is logic high.

10. In an electronic system comprising a power supply, a ground and a resetting device capable of being triggered by a transient voltage detecting circuit, the circuit comprising:

M second detecting devices which each comprises a respective number ($Q_k$) of detecting units, each of the detecting units having a first reference terminal, a second reference terminal, a setting input and an output, in the kth second detecting device, the first reference terminals of all of the detecting units being coupled to the power supply, the second reference terminal of the first detecting unit being coupled to the ground, and a second resistance being coupled between the second reference terminal of the (l+1)th detecting unit and the second reference terminal of the lth detecting unit, wherein M is an integer equal to or larger than 1, k is an integer index ranging from 1 to M, and l is an integer index ranging from 1 to ($Q_k$−1);

at least one voltage source, the setting input of each of the detecting units being respectively coupled to an output of at least one of the voltage source such that the output of the one detecting unit is initially latched by the output of the voltage source coupled to the one detecting unit;

a decision device having an input port, respectively coupled with the outputs of all of the detecting units, the decision device outputting a first logic according to the initial outputs of all of the detecting units; and wherein when a transient voltage occurs at the power supply, in the kth second detecting device, the transient voltage is decayed by the second resistance coupled between the (l+1)th detecting unit and the lth detecting unit, the logic of the output of one of the detecting units of the second detecting units is changed by the transient voltage or the decayed transient voltage, such that the decision device renewably outputs the second logic to trigger the resetting device in accordance with the outputs of all of the detecting units.

11. The circuit of claim 10, further comprising:

N first detecting devices which each comprises a respective number ($P_i$) of detecting units identical to those in the second detecting devices, in the ith first detecting device, the second reference terminals of all of the detecting units being coupled to the ground, the first reference terminal of the first detecting unit being coupled to the power supply, and a first resistance being coupled between the second reference terminal of the (j+1)th detecting unit and the first reference terminal of the lth detecting unit, wherein N is an integer equal to or larger than 1, i is an integer index ranging from 1 to N, and j is an integer index ranging from 1 to ($P_i$−1); and wherein the setting input of each of the detecting units in the first detecting devices being respectively coupled to an output of at least one of the voltage sources such that the output of the one detecting unit is initially latched by the output of the voltage source coupled to the one detecting unit;

wherein the input port of the decision device is also respectively coupled with the outputs of all of the detecting units in the first detecting devices, the decision device outputs the first logic according to the initial outputs of all of the detecting units in the first detecting devices and the second detecting devices; and wherein when the transient voltage occurs at the power supply, in the ith first detecting device, the transient voltage is decayed by the first resistance coupled between the (j+1)th detecting unit and the jth detecting unit, the logic of the output of one of the detecting units in the first detecting devices is changed by the transient voltage or the decayed transient voltage, such that decision device renewably outputs the second logic to trigger the resetting device in accordance with the outputs of all of the detecting units.

12. The circuit of claim 11, wherein all of the first resistances and the second resistances are implemented as via-plugs in a semiconductor structure of the electronic system.

13. The circuit of claim 12, wherein the semiconductor structure of the electronic system comprises a bonding pad, and all of the detecting units are laid out under the bonding pad.

14. The circuit of claim 13, wherein the semiconductor structure of the electronic system comprises a bonding pad, and all of the detecting units are laid out over the bonding pad.

15. The circuit of claim 14, wherein one of the detecting units comprises two NOT gates, and an output of one of the two NOT gates is coupled to an input of the other NOT gate.

16. The circuit of claim 15, wherein one of the detecting units comprises two NAND gates, and an output of one of the two NAND gates is coupled to an input of the other NAND gate.

17. The circuit of claim 16, wherein the first logic is logic high, and the second logic is logic low.

18. The circuit of claim 17, wherein the first logic is logic low, and the second logic is logic high.

19. In an electronic system comprising a power supply, a ground and a resetting device capable of being triggered by a transient voltage detecting circuit, the circuit comprising:

R third detecting devices which each comprises a respective number ($S_r$) of detecting units, each of the detecting units having a first reference terminal, a second reference terminal, a setting input and an output, in the uth third detecting device, the first reference terminal of a first detecting unit of the detecting units being coupled to the power supply, and a first resistance being coupled between the first reference terminal of the (x+1)th detecting unit and the first reference terminal of the xth detecting unit, the second reference terminal of a second detecting unit of the detecting units being coupled to the ground, and a second resistance being coupled between the second reference terminal of the (y+1)th detecting unit and the second reference terminal of the yth detecting unit, wherein R is an integer equal to or larger than 1, u is an integer index ranging from 1 to R, and x and y are an integer index ranging from 1 to ($S_r-1$);

at least one voltage source, the setting input of each of the detecting units being respectively coupled to an output of at least one of the voltage source such that the output of the one detecting unit is initially latched by the output of the voltage source coupled to the one detecting unit;

a decision device having an input port, respectively coupled with the outputs of all of the detecting units, the decision device outputting a first logic according to the initial outputs of all of the detecting units; and wherein the logic of the output of one of the detecting units is changed by a first transient voltage introduced from the power supply or a second transient voltage introduced from the ground, such that the decision device renewably outputs a second logic to trigger the resetting device in accordance with the outputs of all of the detecting units.

* * * * *